United States Patent
Min et al.

(10) Patent No.: US 10,089,379 B2
(45) Date of Patent: Oct. 2, 2018

(54) METHOD FOR SORTING DATA

(75) Inventors: Hong Min, Poughkeepsie, NY (US);
Yefim Shuf, Ossining, NY (US);
Hubertus Franke, Cortlandt Manor, NY (US); Allan Benjamin Lebovitz, Morgan Hill, CA (US); Christopher John Crone, San Jose, CA (US); Akiko Hoshikawa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2353 days.

(21) Appl. No.: 12/193,084

(22) Filed: Aug. 18, 2008

(65) Prior Publication Data

US 2010/0042624 A1 Feb. 18, 2010

(51) Int. Cl.
*G06F 17/30* (2006.01)
*G06F 7/36* (2006.01)

(52) U.S. Cl.
CPC .. *G06F 17/30598* (2013.01); *G06F 17/30607* (2013.01); *G06F 7/36* (2013.01)

(58) Field of Classification Search
None
See application file for complete search history.

(56) References Cited

U.S. PATENT DOCUMENTS

| | | | |
|---|---|---|---|
| 4,086,628 A * | 4/1978 | Woodrum | |
| 5,117,495 A | 5/1992 | Liu | |
| 5,142,687 A * | 8/1992 | Lary | G06F 7/36 |
| 5,175,857 A | 12/1992 | Inoue | |
| 5,185,886 A * | 2/1993 | Edem | G06F 7/36 707/611 |
| 5,349,684 A * | 9/1994 | Edem | G06F 7/36 |
| 5,615,366 A * | 3/1997 | Hansen | |
| 5,640,554 A * | 6/1997 | Take | G06F 7/36 |
| 5,659,733 A | 8/1997 | Yamashita | |
| 5,852,826 A * | 12/1998 | Graunke | G06F 7/36 |
| 6,424,970 B1 | 7/2002 | Arakawa et al. | |
| 6,574,230 B1 * | 6/2003 | Almulhem | H04L 12/5693 370/395.4 |
| 2006/0101086 A1 | 5/2006 | Ray et al. | |

FOREIGN PATENT DOCUMENTS

| | | |
|---|---|---|
| JP | 2001318783 | 5/2000 |
| WO | WO9325958 | 12/1993 |

\* cited by examiner

*Primary Examiner* — Ashish K Thomas
*Assistant Examiner* — Mellissa M Ohba
(74) *Attorney, Agent, or Firm* — Ryan, Mason & Lewis, LLP (57) ABSTRACT

A sequence of one or more input objects are sorted by identifying a property that is exhibited by a sequence of one or more input objects, determining whether each input object from the sequence of one or more input objects exhibits the property, storing each of the one or more input objects into a buffer, wherein an input object is stored in a first buffer if it exhibits the property and an input object is stored in a second buffer if it does not exhibit the property, sorting each of the one or more input objects in each buffer, and merging the one or more input objects in each buffer into a sequence of one or more input objects.

21 Claims, 4 Drawing Sheets

METHOD FOR SORTING DATA

FIELD OF THE INVENTION

The present invention generally relates to information technology, and, more particularly, to data sorting.

BACKGROUND OF THE INVENTION

Sort is a pervasively used operator in database queries. Usually, the sort algorithm in databases has a good performance complexity (also known as computational or time complexity) on average and worst input cases. Another attribute of a database sort is that one cannot assume that the entire input will fit in memory, or that the size of input is exactly known. For this reason, a database sort usually includes a merge phase to merge subsets of a result that are separately sorted.

Often, the input data has certain characteristics. One of the characteristics can be that the input records are almost sorted (sometimes referred to as clustered). This can be because that data is stored in such a way or previous operations in the query processing provide such an input. The attribute of such clustering could be known before a sort happens via, for example, database statistics. For example, in some databases, high clustering implies that data accessed by index key order is somewhat sorted.

Existing approaches that have good average/worst complexity do not generate the best performance for input records with such clustering characteristics. There are algorithms that are efficient for sorted input, such as an insertion sort and a library sort, etc. However, such algorithms require the entire input to fit in memory. The library sort also allocates a larger amount of extra memory to avoid its worst case sort complexity of $O(n^2)$, which often is not realistic for databases and is not scalable for large data sets. Some algorithms also use extra memory to reduce computational (time) complexity.

Also, a database management system (DBMS) engine can maintain some statistics on data in tables. The statistics can be used for selecting an efficient query execution plan, and the statistics provide some hints on the characteristics of input. However, existing approaches do not use the statistics for database query sort or for specializing a query sort. Consequently, the "one size fits all" sorting algorithm does not perform optimally since it cannot pick the best sorting strategy. For example, existing approaches for sorting data do not handle data that is clustered (that is, almost sorted) which is indicated by a "cluster ratio of an index" in a special way.

Additionally, existing approaches lack the use of statistics to launch a more efficient algorithm for an "almost sorted input" data. Some existing approaches include algorithms that can achieve O(N) complexity (O is referred as "Big O" notation, as would be appreciated by one skilled in the art) on the best case input sequence, but they require all input data to fit in memory, some have $O(N^2)$ complexity in the worst case, and some sort algorithms use significantly more extra memory (as much as N times more) to maintain O(N) complexity.

Consequently, there is a need for an approach that can handle an ideal input most efficiently and a non-ideal input well without consuming more memory than the operation is allowed.

SUMMARY OF THE INVENTION

Principles of the present invention provide techniques for sorting data. An exemplary method (which may be computer-implemented) for sorting a sequence of one or more input objects, according to one aspect of the invention, can include steps of identifying a property that is exhibited by a sequence of one or more input objects, determining whether each input object from the sequence of one or more input objects exhibits the property, storing each of the one or more input objects into a buffer, wherein an input object is stored in a first buffer if it exhibits the property and an input object is stored in a second buffer if it does not exhibit the property, sorting each of the one or more input objects in each buffer, and merging the one or more input objects in each buffer into a sequence of one or more input objects.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus or system including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the present invention include hybrid sort techniques based on input characteristics. One or more embodiments of the invention include a sort mechanism that achieves very efficient sort complexity on the ideal clustered input. The sorting mechanism relies, for example, on pre-sort or nearly sort indication on the clustering of the records. Also, in one or more embodiments of the invention, one can infer that the data is mostly sorted via sampling (that is, by examining a subset of data).

One or more embodiments of the invention use two buffers, with each buffer associated with a different sort algorithm. One buffer can be used to preserve the ordered subset of the input records. A new record is put into such a buffer if it can be placed orderly among the last few records in the buffer (that is, local insertion). Another buffer can be used to store those out of order records and as the input buffer for a sort algorithm that has a good average sort complexity. The records in such a buffer are likely in a random order.

The techniques described herein provide an efficient time (computational) complexity for a nearly sorted input. One or more embodiments of the invention include a combined computation complexity, O(M)+O(L log L)+O(N), wherein N=M+L. N is the total number of records and/or objects to be sorted. Algorithm 1, whose complexity is O(M), operates on a subset of input with M records that is identified to qualify for buffer 1. Algorithm 2, whose complexity is O(L log L), operates on a subset of input with L records that is identified to qualify for buffer 2. Also, one or more embodiments of the invention include a merge, O(N). When data is nearly sorted, that is, M>>L, the sort complexity of the algorithm is effectively O(N).

The techniques described herein are also memory efficient. The memory footprint requirement for buffer 1 is small. Algorithm 1 and buffer 1 preserve the input sequence, and already-sorted input can be spilled onto disks for a merge phase. Additionally, the memory access pattern for buffer 1 is cache friendly. The access pattern is sequential, with no swapping of contents of memory locations residing far from each other. As such, this allows the exploitation of hardware prefetch.

One or more embodiments of the present invention also include an alternative single buffer implementation, where one can combine buffer 1 and buffer 2 into a single buffer, and fill in buffer 1 and buffer 2 from the two ends of the single buffer. Also, the division of buffer 1 and buffer 2 can be dynamic depending on which side an input record falls to.

As detailed herein, one or more embodiments of the invention include a hybrid sort mechanism that achieves very efficient sort complexity (O(N)) on the ideal clustered input and good average/worst sort complexity (O(N*log(N)) when the input is less clustered. The mechanism can rely, for example, on some pre-sort indication on the clustering of the records. Also, in one or more embodiments of the invention, one can infer that the data is mostly sorted via sampling (that is, by examining a subset of data). As noted herein, one or more embodiments of the present invention use two buffers, with each buffer being associated with a different sort algorithm.

One or more embodiments of the invention can operate as follows. When obtaining the next arriving input record, one can either perform a local insertion using an insertion sort on the last few records in a first buffer, or one can also append the record to a second buffer if the record cannot be inserted locally into the first buffer. By way of example, the number of these records (that go into a second buffer) can be small due to the clustering attribute of the input. Also, buffers may fill up at some point. As such, if the first buffer is filled up, one can write all of its records to a disk file. They will already be in a sorted order. If the second buffer is filled up, one can sort its records using an algorithm with a good average complexity and write the result (in a sorted order) to a disk file.

Additionally, one can continue with emptied buffers. At the end of input, one can sort all records in the second buffer using an algorithm with a good average complexity. One can merge the result with ordered records from the first buffer and potentially those previously sorted records in the disk files to generate the final ordered output. The sorting of records in the second buffer can be performed concurrently as records arrive using algorithms such as, for example, a tournament tree sort.

One or more embodiments of the invention also include additional flexible ways of allocating the two buffers. For example, one can combine the two buffers into a single buffer. In a single buffer, one can preserve the ordered subset starting from one end of the buffer and use the other end of the buffer to store the "out of order" records.

The techniques described herein include performance advantages over disadvantageous existing approaches. For example, one or more embodiments of the invention provide computational efficiency by preserving the ordering attribute on input records and applying good average computation complexity on a very small portion of records that are out-of-order. Additionally, one or more embodiments of the invention avoid the potentially large number of record swaps of an insertion sort, and are also more cache friendly by avoiding potential long distance record swapping in an insertion sort.

The techniques detailed herein are also memory efficient and flexible. For example, when a large amount of memory is available and all records can fit in a buffer, a nearly linear sort complexity can be achieved. When only a small amount of memory is available, the number of merge phases can still be kept to the minimum when it cannot be avoided.

One or more embodiments of the present invention can also sort high clustered or nearly sorted records in m*O(N)+1*O(N*log(N)) time, wherein 1<<m if data is nearly sorted (for example, "m" is the percentage of number of ordered data elements out of a total record number N, and "1" is the percentage of number of data elements that are not ordered elements out of a total record number N). The pre-sort knowledge of data being nearly sorted can be obtained, for example, by being provided by database catalog statistics or real time statistics such as cluster ratio of an index, by previous operators in the same query generating such an input for sort, and/or by a run-time sampling that provides such indication on the sort input.

If, at real time, the sort process discovers that data is not nearly sorted, by using a single buffer implementation described herein, most records will be sorted by a sort process with good average/worst sort complexity (O(N*log(N)) such as, for example, a tournament tree sort. The second buffer can be used as an input buffer for such a sort process.

As described below, one or more embodiments of the invention can also sort nearly sorted records in an ascending order. The following flow (that is, flow #1) can also apply to sorting records in the descending order with small changes. As such, an illustrate embodiment of the invention can include the following flow. One can allocate buffer A ("Buffer-1" in FIG. 1) of size a, (that is, the number of slots in A is a) and pick a small number k as a local insertion range (for example k=10). Also, one can allocate buffer B of size b (that is, the number of slots in B is b).

Further, one can start to put records in A from its first slot A[1]. Use A[1] to represent the first slot in A, and A[i] is the $i^{th}$ slot in A. Assume that slots from A[1] to A[i-1] are all filled, and A[i] . . . A[a] are still vacant, where i is the iteration index. Also, record r arrives and one can proceed as follows. If, for the key to be compared, of each record r≥A[i-1], then A[i]=r, else if r≥A[i-k] (k records before), one can locate A[i-h] between A[i-k] and A[i-1] such that A[i-h]≤r<A[i-h+1], h is a number between 1 and k. Additionally, one can shift records A[i-h+1] . . . A[i-1] to A[i-h+2] . . . A[i] accordingly, and place r at A[i-h+1], or else append r to buffer B.

In one or more embodiments of the invention, one can repeat the previous step until all records are inserted either in buffers A or B.

If A is filled up, one can write all of its records to a disk file (wherein they are already in a sorted order) and continue with an emptied buffer. If B is filled up, one can sort its records using an algorithm with a good average complexity (such as, for example, a tournament tree sort or a random pivot quick-sort), write the result to a disk file and continue with an emptied buffer B. At the end of input, one can sort records in B using an algorithm with a good average complexity (such as, for example, a tournament tree sort or a random pivot quick-sort) and merge records in A, B and all files on the disk to generate the final sorted output.

One or more embodiments of the invention can also include an additional flow (that is, flow #2) that allocates a single buffer for more flexible buffer usage of the algorithm, such as described as follows. One can allocate buffer C of size c (that is, the number of slots in C is c and one end of the buffer is slot C[1] and the other end is C[c]), and pick a small number k as a local insertion range (for example k=10). Further, one can start to put records in C from the C[1] end to the C[c] end of C. Assume that the beginning of the buffer (c[1] end), C[1] to C[i−1] are filled, and from the other end of the buffer (C[c] end) C[j] . . . C[c] are filled, i<j, and C[i] . . . C[j−1] are still vacant. Record r arrives, and one can proceed as follows. If r≥C[i−1], then C[i]=r, else if r≥C[i−k] (k records before) but r<C[i−k+1], then shift records in C[i−k+1] to C[i−1] accordingly to the direction of C[c] and insert r into C[r−k+1], or else one can put at C[j−1].

In one or more embodiments of the invention, one can repeat the above step until all records are inserted into C. Additionally, if C is filled up (that is, the insert from the C[1] end and the C[c] end meet in between, for example, at buffer slot C[p]), 1<p and p≤c, one can write records in either one or both parts to disk files to free up buffer according to the following. One can write c[1] to c[p] directly to disk files because they are ordered, and/or one can sort c[p+1] to c[c] using an algorithm with good average complexity (such as, for example, tournament tree sort or random pivot quick-sort) and write the result to a disk file.

At the end of input, one can assume that buffer slots from C[1] to C[x] are filled, as well as buffer slots from C[y] to C[c], and 1≤x<y and C[x+1] . . . C[y−1] are still vacant. Further, one can sort C[y] . . . C[c] using an algorithm with a good average complexity (such as, for example, a tournament tree sort or random pivot quick-sort) and merge the sorted result with C[1] to C[x], as well as with all files on the disk to generate the final sorted output.

As described herein, buffer B in flow #1 can be used directly as an input buffer for a sort algorithm such as, for example, tree sort. One can additionally perform a sort on B concurrently when there is a new record put in B. One or more embodiments of the invention can also extend an algorithm to more than two buffers, where all buffers except one are used to hold sorted subsets. For example, if a local insertion to a first buffer fails, one can perform a local insertion to a second buffer. If both insertions fail, then one can append the record to the third buffer.

Figure 1:
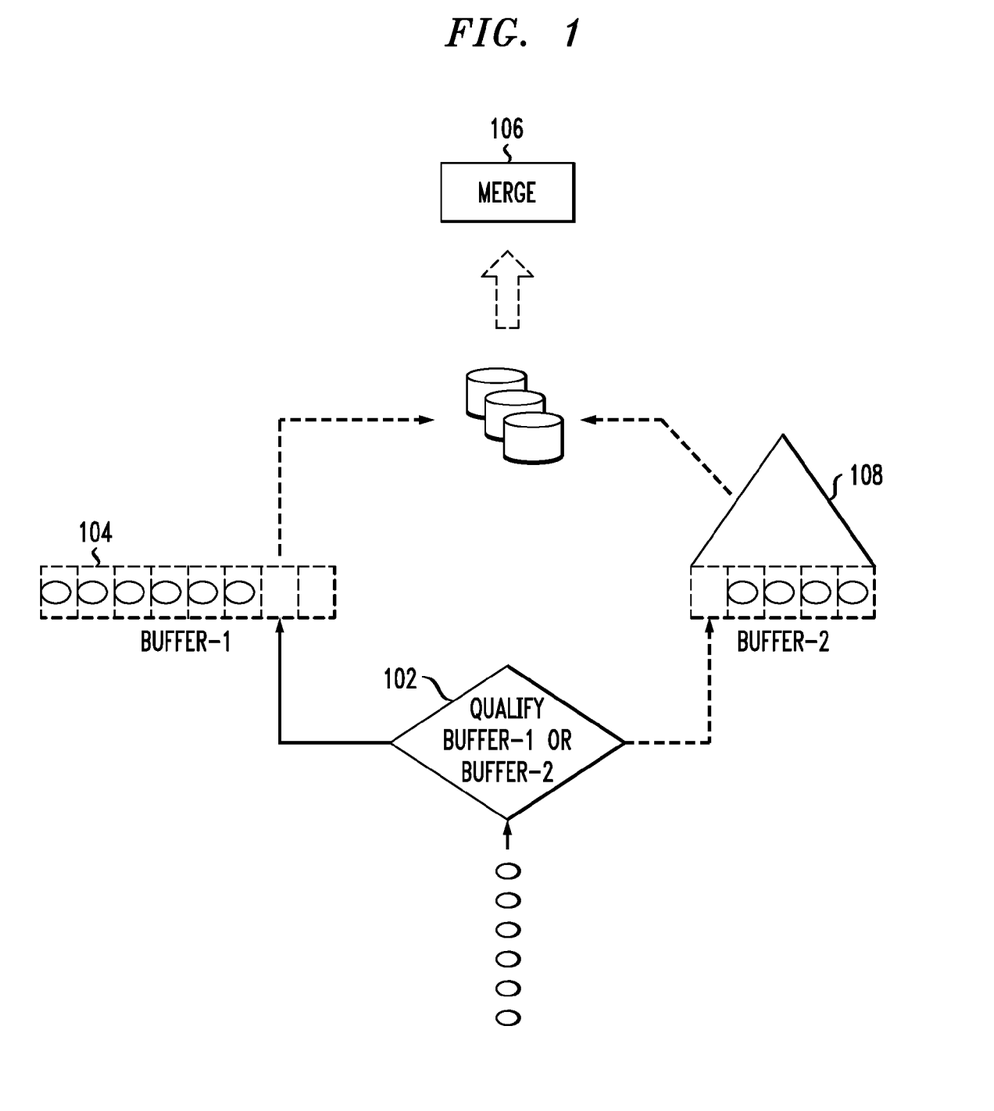
FIG. 1 is a diagram illustrating hybrid sort for a nearly sorted input, according to an embodiment of the present invention.

FIG. 1 is a diagram illustrating hybrid sort for a nearly sorted input, according to an embodiment of the present invention. By way of illustration, FIG. 1 depicts component 102, which can qualify buffer-1 104 or buffer-2 108. Qualifying buffer-1 104 can include using algorithm-1, which is a local insertion sort that preserves order and includes O(N) complexity. Qualifying buffer-2 108 can include using algorithm-2 (such as, for example, a tournament tree sort) that takes input that could not be put into buffer-1 104, and includes O(N log N) complexity in the worst case. FIG. 1 also depicts a merge component 106, which includes O(N) complexity.

Figure 2:
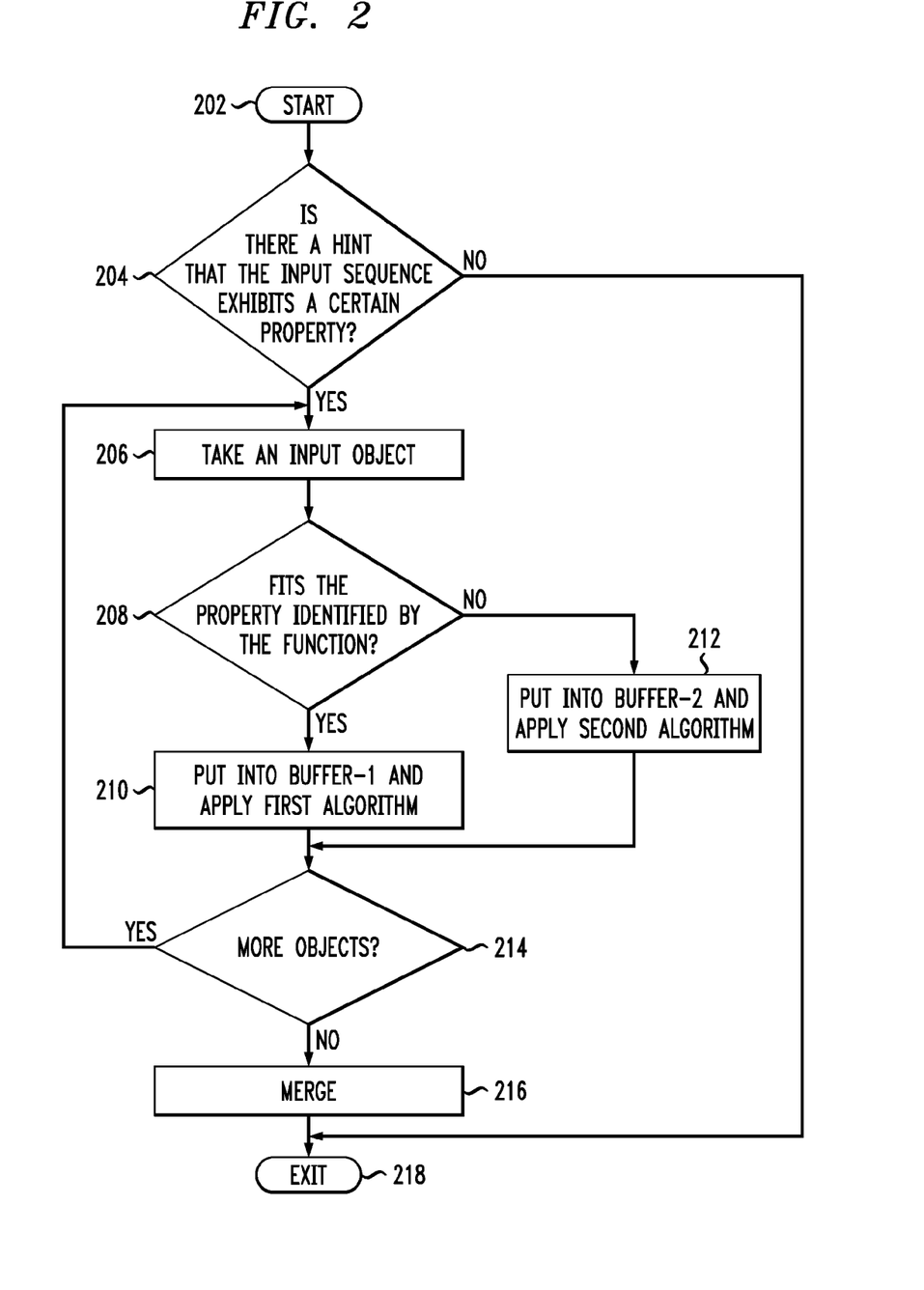
FIG. 2 is a flow diagram illustrating techniques for hybrid sorting, according to an embodiment of the present invention.

FIG. 2 is a flow diagram illustrating techniques for hybrid sorting, according to an embodiment of the present invention. Step 202 includes starting the techniques. Step 204 includes determining whether there is a hint that the input sequence exhibits a certain property. If the answer to the question in step 204 is no, then one can exit the techniques in step 218. If the answer to the question in step 204 is yes, then one can take an input object in step 206. Step 208 includes determining whether there exists a fit with the property identified by the function. If the answer to the question in step 208 is no, one can put the input object into buffer-2 and apply the second algorithm (that is, algorithm-2, as depicted in FIG. 1) in step 212. If the answer to the question in step 208 is yes, one can put the input object into buffer-1 and apply the first algorithm (that is, algorithm-1, as depicted in FIG. 1) in step 210.

Additionally, step 214 includes determining whether there are more objects. If the answer to the question in step 214 is yes, one can return to step 206. If the answer to the question in step 214 is no, one can perform a merge at step 216. Also, as noted above, step 218 includes exiting the techniques.

Figure 3:
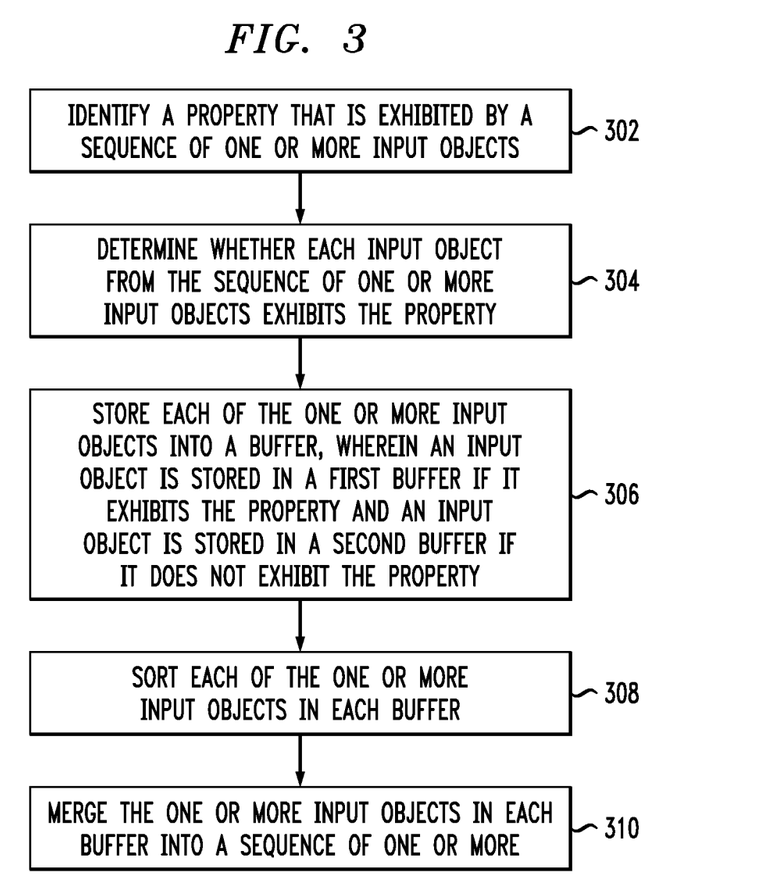
FIG. 3 is a flow diagram illustrating techniques for sorting a sequence of one or more input objects, according to an embodiment of the present invention.

FIG. 3 is a flow diagram illustrating techniques for sorting a sequence of one or more input objects, according to an embodiment of the present invention. Step 302 includes identifying a property that is exhibited by a sequence of one or more input objects. The property can include, for example, whether the sequence of input objects is mostly ordered and/or well clustered. Step 304 includes determining whether each input object from the sequence of one or more input objects exhibits the property.

Step 306 includes storing each of the one or more input objects into a buffer (for example, a memory buffer), wherein an input object is stored in a first buffer (for example, buffer-1) if it exhibits the property and an input object is stored in a second buffer (for example, buffer-2) if it does not exhibit the property. For example, a region in the first buffer can include one or more input objects derived from a final end (that is, the last few input objects) of the sequence of one or more input objects. Additionally, one or more embodiments of the invention can include determining whether an input object can be inserted into or appended after the above-noted "final end" region in the first buffer.

Further, in one or more embodiments of the invention, each buffer can be dynamically sized (for example, the size of the two portions of buffer (that is, buffer-1 and buffer-2) are increased or decreased based on a number of objects identified by the function that fit the property).

Step 308 includes sorting each of the one or more input objects in each buffer. Sorting the input objects in each buffer can include, for example, sorting the input objects in the first buffer with a first algorithm and sorting the input objects in the second buffer with a second algorithm. Also, the first sorting algorithm can include an insertion sort on a local region of the first buffer, and the second sorting algorithm can include a sort algorithm with good general and worst case computation complexity.

Step 310 includes merging the one or more input objects in each buffer into a sequence of one or more input objects. The techniques depicted in FIG. 3 can also include using an indicator to identify the property that is exhibited by the sequence of input objects, wherein the indicator is well clustered. Additionally, one or more embodiments of the invention can include combining the first buffer and the second buffer into one buffer, wherein one can preserve an ordered subset starting from a first end of the buffer and using a second end of the buffer to store one or more out of order input objects. Also, the division of the first buffer and the second buffer can be dynamic depending on which side an input record falls to.

The techniques depicted in FIG. 3 can also include concurrently sorting the first buffer and the second buffer. Further, one or more embodiments of the invention include using three or more buffers, wherein all of the buffers except one are used to hold sorted subsets of input objects. Also, each of the three or more buffers can include a corresponding property (for example, being in a certain order and/or being within a certain range of values).

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 4:
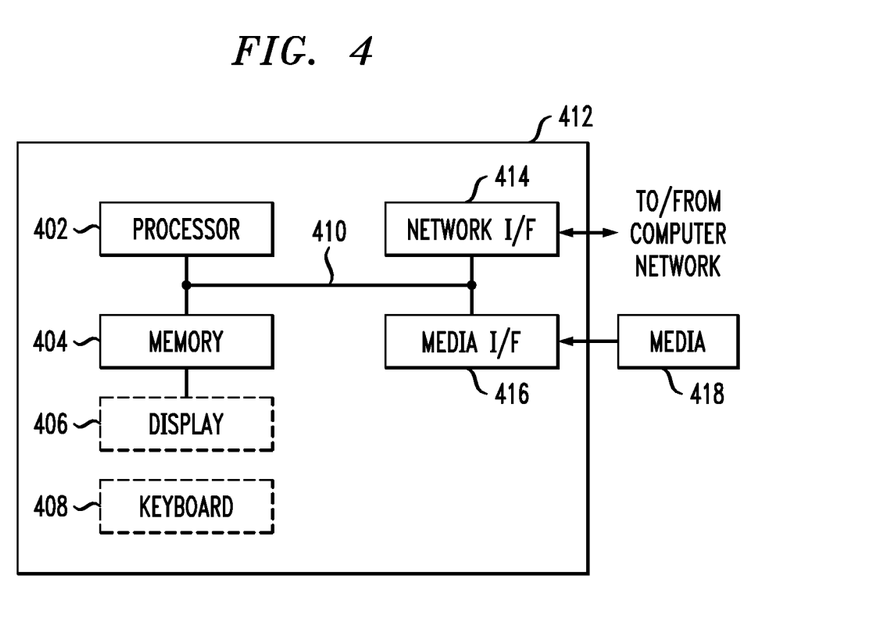
FIG. 4 is a system diagram of an exemplary computer system on which at least one embodiment of the present invention can be implemented.

At present, it is believed that the preferred implementation will make substantial use of software running on a general-purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 418) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 404), magnetic tape, a removable computer diskette (for example, media 418), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 402 coupled directly or indirectly to memory elements 404 through a system bus 410. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, providing efficient time complexity for a nearly sorted input.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for sorting a sequence of one or more input objects, comprising the steps of:
    identifying a property that is exhibited by a sequence of one or more input objects, wherein said property indicates whether said sequence of one or more input objects is mostly sorted and is used to select one of a plurality of buffers for storing each input object;
    determining whether each input object from the sequence of one or more input objects exhibits the property;

storing each of the one or more input objects into one of said plurality of buffers, wherein an input object is stored in a first buffer when said input object exhibits the property and an input object is stored in a second buffer that takes the input objects that could not be put into the first buffer when said input object does not exhibit the property;

sorting each of the one or more input objects in each buffer, wherein the first buffer is sorted with a first sorting algorithm which is an insertion sort on a local region of the first buffer and the second buffer is sorted with a second sorting algorithm, wherein the second sorting algorithm is a sort algorithm for sorting objects which are not substantially ordered and wherein the first sorting algorithm is different than the second sorting algorithm; and merging the one or more input objects in each buffer into a sequence of one or more input objects, wherein the first sorting algorithm and the second sorting algorithm are distinct from each other and from a process that performs the merging.

2. The method of claim 1, wherein the second sorting algorithm is a sort algorithm with general and worst case computation complexity.

3. The method of claim 1, wherein a region in the first buffer comprises one or more input objects derived from a final end of the sequence of one or more input objects.

4. The method of claim 3, further comprising determining whether an input object can be at least one of inserted into the region and appended after the region.

5. The method of claim 1, wherein each buffer is dynamically sized.

6. The method of claim 1, wherein the property comprises whether the sequence of one or more input objects is at least one of mostly ordered and well clustered.

7. The method of claim 1, further comprising combining the first buffer and the second buffer into one buffer.

8. The method of claim 7, further comprising preserving an ordered subset starting from a first end of the one buffer and using a second end of the one buffer to store one or more out of order input objects.

9. The method of claim 7, wherein a division of the first buffer and the second buffer is dynamic depending on which side an input record falls to.

10. The method of claim 1, further comprising concurrently sorting the first buffer and the second buffer.

11. The method of claim 1, further comprising using three or more buffers, wherein all of the three or more buffers except one are used to hold one or more sorted subsets of input objects.

12. The method of claim 11, wherein each of the three or more buffers comprises a corresponding property.

13. A computer program product comprising a non-transitory computer readable medium having computer readable program code for sorting a sequence of one or more input objects, said computer program product including:

computer readable program code for identifying a property that is exhibited by a sequence of one or more input objects, wherein said property indicates whether said sequence of one or more input objects is mostly sorted and is used to select one of a plurality of buffers for storing each input object;

computer readable program code for determining whether each input object from the sequence of one or more input objects exhibits the property;

computer readable program code for storing each of the one or more input objects into one of said plurality of buffers, wherein an input object is stored in a first buffer if said input object exhibits the property and an input object is stored in a second buffer that takes the input objects that could not be put in the first buffer if said input object does not exhibit the property;

computer readable program code for sorting each of the one or more input objects in each buffer, wherein the first buffer is sorted with a first sorting algorithm which is an insertion sort on a local region of the first buffer and the second buffer is sorted with a second sorting algorithm for sorting objects which are not substantially ordered and wherein the first sorting algorithm is different than the second sorting algorithm; and computer readable program code for merging the one or more input objects in each buffer into a sequence of one or more input objects, wherein the first sorting algorithm and the second sorting algorithm are distinct from each other and from a process that performs the merging.

14. The computer program product of claim 13, further comprising computer readable program code for combining the first buffer and the second buffer into one buffer, wherein combining the first buffer and the second buffer into one buffer preserves an ordered subset starting from a first end of the one buffer and using a second end of the one buffer to store one or more out of order input objects.

15. The computer program product of claim 13, further comprising computer readable program code for concurrently sorting the first buffer and the second buffer.

16. The computer program product of claim 13, further comprising computer readable program code for using three or more buffers, wherein all of the three or more buffers except one are used to hold one or more sorted subsets of input objects, and wherein each of the three or more buffers comprises a corresponding property.

17. An apparatus for sorting a sequence of one or more input objects, comprising:

a memory; and at least one processor coupled to said memory and configured to:

identify a property that is exhibited by a sequence of one or more input objects, wherein said property indicates whether said sequence of one or more input objects is mostly sorted and is used to select one of a plurality of buffers for storing each input object;

determine whether each input object from the sequence of one or more input objects exhibits the property;

store each of the one or more input objects into one of said plurality of buffers, wherein an input object is stored in a first buffer if said input object exhibits the property and an input object is stored in a second buffer that takes the input objects that could not be put into the first buffer if said input object does not exhibit the property;

sort each of the one or more input objects in each buffer, wherein the first buffer is sorted with a first sorting algorithm which is an insertion sort on a local region of the first buffer and the second buffer is sorted with a second sorting algorithm for sorting objects which are not substantially ordered and wherein the first sorting algorithm is different than the second sorting algorithm; and merge the one or more input objects in each buffer into a sequence of one or more input objects, wherein the first sorting algorithm and the second sorting algorithm are distinct from each other and from a process that performs the merge.

18. The apparatus of claim 17, wherein the at least one processor coupled to said memory is further operative to combine the first buffer and the second buffer into one buffer, wherein combining the first buffer and the second buffer into one buffer preserves an ordered subset starting from a first end of the one buffer and using a second end of the one buffer to store one or more out of order input objects.

19. The apparatus of claim 17, wherein the at least one processor coupled to said memory is further operative to concurrently sort the first buffer and the second buffer.

20. The apparatus of claim 17, wherein the at least one processor coupled to said memory is further operative to use three or more buffers, wherein all of the three or more buffers except one are used to hold one or more sorted subsets of input objects, and wherein each of the three or more buffers comprises a corresponding property.

21. An apparatus for sorting a sequence of one or more input objects, said apparatus comprising:

means for identifying a property that is exhibited by a sequence of one or more input objects, wherein said property indicates whether said sequence of one or more input objects is mostly sorted and is used to select one of a plurality of buffers for storing each input object;

means for determining whether each input object from the sequence of one or more input objects exhibits the property;

means for storing each of the one or more input objects into one of said plurality of buffers, wherein an input object is stored in a first buffer if said input object exhibits the property and an input object is stored in a second buffer that takes the input objects that could not be put into the first buffer if said input object does not exhibit the property;

means for sorting each of the one or more input objects in each buffer, wherein the first buffer is sorted with a first sorting algorithm and the second buffer is sorted with a second sorting algorithm for sorting objects which are not substantially ordered and wherein the first sorting algorithm is different than the second sorting algorithm; and means for merging the one or more input objects in each buffer into a sequence of one or more input objects, wherein the first sorting algorithm and the second sorting algorithm are distinct from each other and from a process that performs the merging.

\* \* \* \* \*